(12) United States Patent
LoGalbo et al.

(10) Patent No.: US 7,382,757 B2
(45) Date of Patent: Jun. 3, 2008

(54) METHOD FOR SUPPORTING A PLURALITY OF SUBSCRIBERS OPERATING ON DIFFERENT FREQUENCY BANDS USING A SINGLE ACCESS POINT

(75) Inventors: Robert D. LoGalbo, Hoffman Estates, IL (US); Tyrone D. Bekiares, Lake in the Hills, IL (US); Shmuel Silverman, Buffalo Grove, IL (US)

(73) Assignee: Motorola, Inc., Schaumberg, IL (US)

( * ) Notice: Subject to any disclaimer, the term of this patent is extended or adjusted under 35 U.S.C. 154(b) by 778 days.

(21) Appl. No.: 10/668,865

(22) Filed: Sep. 23, 2003

(65) Prior Publication Data

US 2005/0063349 A1 Mar. 24, 2005

(51) Int. Cl.
*H04Q 7/24* (2006.01)

(52) U.S. Cl. .................... 370/338; 455/428; 455/435.2; 455/435.3; 455/447; 455/560; 455/443; 455/448; 455/63.3; 370/341; 370/346; 370/360

(58) Field of Classification Search ................ 370/460, 370/461, 462, 338, 341, 346, 360; 455/63.3, 455/428, 435.2, 435.3, 443, 447, 448, 560
See application file for complete search history.

(56) References Cited

U.S. PATENT DOCUMENTS

| | | | |
|---|---|---|---|
| 5,960,344 A * | 9/1999 | Mahany | 455/432.2 |
| 6,006,271 A | 12/1999 | Grabiec | |
| 6,587,453 B1 | 7/2003 | Romans et al. | |
| 7,031,274 B2 * | 4/2006 | Sherman | 370/321 |
| 2002/0071448 A1 * | 6/2002 | Cervello et al. | 370/445 |
| 2003/0174690 A1 * | 9/2003 | Benveniste | 370/350 |
| 2003/0178984 A1 * | 9/2003 | Lansford et al. | 324/132 |
| 2007/0217385 A1 * | 9/2007 | Meier | 370/338 |

* cited by examiner

*Primary Examiner*—Charles N. Appiah
*Assistant Examiner*—Kwasi Karikari
(74) *Attorney, Agent, or Firm*—Randi L. Karpinia

(57) ABSTRACT

The present invention allows a single access point ("AP"; 100) to support a plurality of devices (102, 104) operating on different frequency bands. During a first period of time, the AP initiates a contention free period at a first frequency. The AP switches from the first frequency to a second frequency, and communicates with devices operating at the second frequency. Periodically during the first period of time, the AP temporarily ceases communication with devices operating at the second frequency to initiate a contention free period at the second frequency, switch from the second frequency to the first frequency, initiate another contention free period at the first frequency, and switch from the first frequency back to the second frequency.

6 Claims, 2 Drawing Sheets

METHOD FOR SUPPORTING A PLURALITY OF SUBSCRIBERS OPERATING ON DIFFERENT FREQUENCY BANDS USING A SINGLE ACCESS POINT

REFERENCE TO RELATED APPLICATION

The present application is related to U.S. application Ser. No. 10/325,384 filed Dec. 20, 2002, titled "Method of Communicating with a Plurality of Sets of Users" by Ekl et al. commonly owned together with this application by Motorola, Inc.

FIELD OF THE INVENTION

The present invention relates generally to a method for supporting a plurality of subscribers operating on different frequency bands using a single access point.

BACKGROUND OF THE INVENTION

Current wireless systems, most notably 802.11 wireless local area network ("WLAN") systems, operate in half-duplex mode on a single frequency. That is, a subscriber in a wireless system either transmits or receives at any given time, but not both simultaneously. Further, the subscriber typically operates on a single frequency. Once a subscriber is on a frequency, it stays on that frequency.

A problem with today's wireless systems is that they only serve one group, where a group is a set of subscribers with common characteristics (e.g., operating on a common frequency band). In the broad case, groups can be large classes of subscribers. Examples of two different groups are city workers and public safety users (e.g., police personnel, fire personnel, or the like). In a technical configuration of the system, and specifically in the case of a WLAN access point ("AP"), the common set of technical characteristics includes frequency, service set identifier ("SSID"), and associations.

To serve multiple groups with existing technology requires multiple APs, which is typically not economically feasible. Further, multiple APs in close proximity exhibit interference issues, which non-deterministically decreases the throughput to both APs (in the best case scenario), and may make the APs completely unusable (in the worst case scenario).

Thus, there exists a need for a single AP to support a plurality of subscribers operating on different frequency bands.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
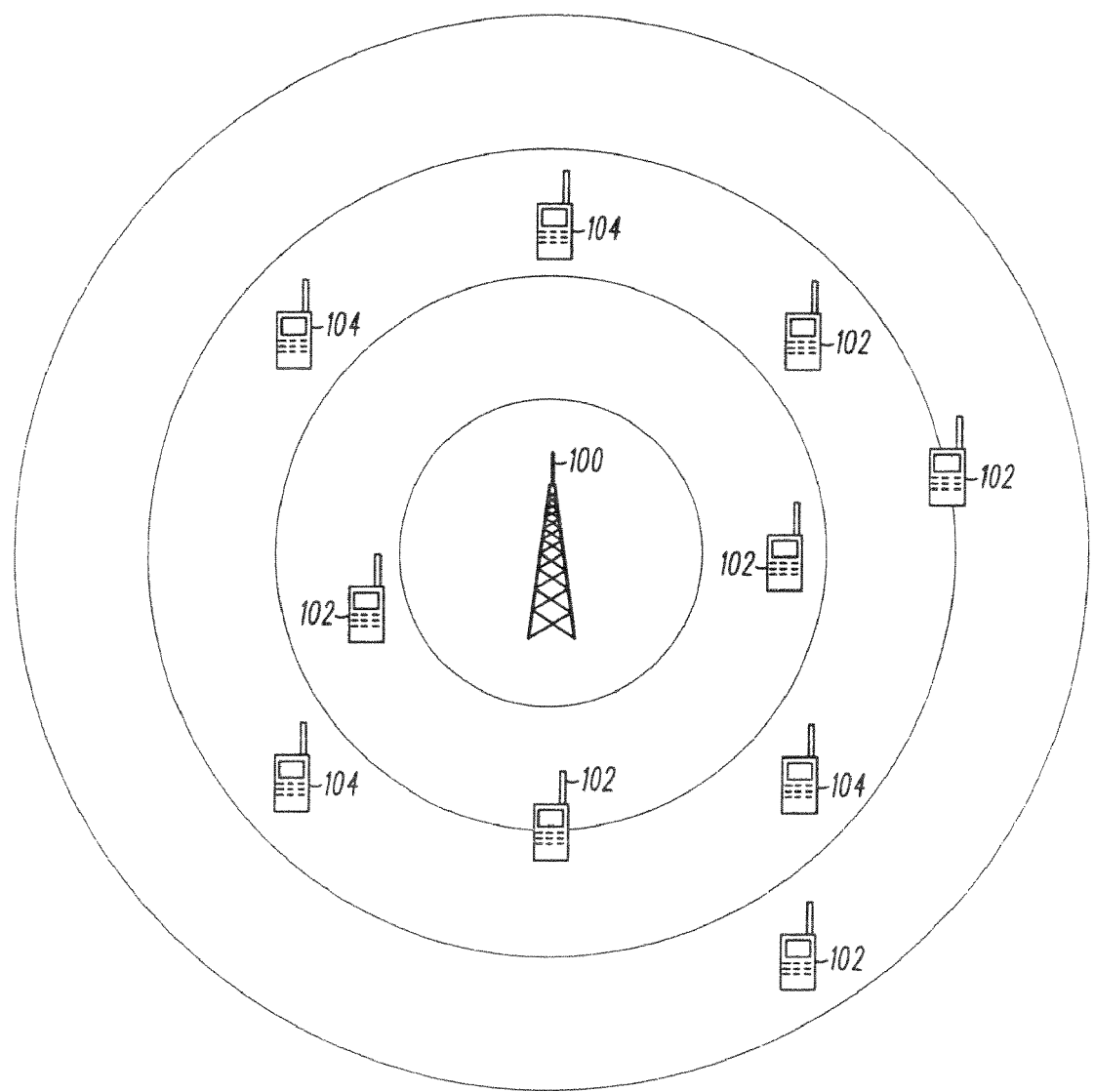
FIG. 1 illustrates an example of a system topology having a single access point supporting both a first set of subscribers operating at a first frequency and a second set of subscribers operating at a second frequency in accordance with the present invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

As illustrated in FIG. 1, the present invention allows one physical access point ("AP") 100 to support a plurality of devices/subscribers 102, 104 operating on different frequency bands by timesharing between a plurality of frequency bands. For simplicity sake, the following discussion assumes that the AP 100 is timesharing between two different frequency bands (e.g., 4.9 GHz and 5.0 GHz); in other words, the AP 100 operates in the first frequency band for some predetermined amount of time, then operates in the second frequency band for some predetermined amount of time, reverts back to the first frequency band, etc. As a result, the AP 100 maintains states in both frequency bands. It should be noted, however, that the amount of time the AP 100 operates in the first frequency band is not necessarily equal to the amount of time the AP operates in the second frequency band. Thus, the present invention saves the customer from buying two separate APs for two separate frequency bands requiring two separate power amplifiers. Further, the present invention mitigates interference between the two frequency bands. Details of the present invention are illustrated below for exemplary purposes only, and are not intended to limit the scope of the present invention.

For the sake of terminology, the present invention refers to the frequency band in which the AP 100 is currently receiving and/or transmitting information as the active frequency band, and the frequency band in which the AP 100 is not currently receiving and/or transmitting information as the inactive frequency band. Upon startup, a duty cycle of M:N beacon intervals between the active and inactive frequency bands are chosen, where both M and N are integer numbers. As an example, the active frequency band for one frequency will last "M" beacon intervals; the active frequency band for the other frequency will last "N" beacon intervals. The length of one beacon interval can be arbitrarily long, thus accounting for most any circumstance. Preferably, an average timeshare between the two frequency bands is maintained to allow information exchanges that occur on frequency band-switching boundaries to complete the transaction; average timesharing is illustrated further in the example below.

If either M or N of the duty cycle is not 1, the AP 100 swiftly transitions to the inactive frequency band and transmits a beacon to keep subscribers operating on the inactive frequency band from possibly migrating to another AP 100 (i.e., disassociating from its current AP). The AP 100 does this by quickly creating a contention free period ("CFP") on the first frequency band (i.e., the AP 100 signals all subscribers 102 operating on the first frequency band to stay quite and transmit only if polled by the AP 100), transitioning to the second frequency band, transmitting a CFP-indicating beacon on the second frequency band, transitioning back to the first frequency band, and transmitting a CF-End on the first frequency band (i.e., the AP 100 signals all subscribers 102 operating on the first frequency band that the CFP has ended and initiates a distributed coordinated function ("DCF") mode; the DCF mode allows any subscriber in the frequency band to transmit inbound to the AP 100 without having to be polled by the AP 100).

Every beacon has a traffic indication message ("TIM") which is a delivery traffic indication message ("DTIM") to insure that at least one beacon is present in each beacon interval to deliver traffic to subscribers in power savings mode. The TIM and the DTIM signals subscribers to stay awake and receive information because outbound traffic has been buffered and awaits delivery. The TIM and the DTIM are typically known to those individuals skilled in the art and are familiar with the 802.11 standard, and thus will not be discussed in greater detail.

In order for the DTIM to approximate a regular periodicity (if not periodic, the subscriber is always listening for the DTIM which is counterproductive to the subscriber), and because every CFP signal is initiated by a DTIM, each beacon is a DTIM.

The last beacon in every active frequency band signals the CFP and therefore this beacon must be a DTIM; however this DTIM only signals a CFP and does not signal subscribers that traffic is pending delivery. Therefore, at least one other beacon in the active frequency band must be a DTIM. Therefore, to insure DTIM periodicity, every beacon must be a DTIM.

The DTIM period is therefore one for all frequency bands. If multicast messages are pending for sleeping subscribers, these subscribers can now receive them after each beacon (except the last) in every active period. After every beacon (except the last) and after all subscriber traffic has completed, the AP terminates the CFP with a CF-End. At the end of the active time, the AP 100 signals a CFP (which is a DTIM—however no pending multicast traffic will be indicated in the TIM), transitions to the other frequency band and creates a CFP with a DTIM at the beginning of the newly started active frequency band.

While the subscribers are in an inactive frequency band, its best for these subscribers to suspend inbound traffic. If the subscribers do not suspend inbound traffic, the subscribers will transmit inbound to the AP 100, the AP 100 will not hear the subscribers (because it is "off" frequency) and therefore the subscribers will receive no acknowledgement ("ACK") from the AP 100. Failure to receive an ACK from the AP 100 will result in the subscriber counting a failed attempt against that inbound packet. With enough failed attempts, the subscriber will drop the packet. Preferably, during the inactive frequency band, because the AP 100 cannot hear any transmissions from subscribers operating in the inactive frequency band, the subscribers should be "deactivated" so as to prevent dropped packets. In addition to preventing subscribers from transmitting inbound to the AP 100, deactivating the subscribers operating in the inactive frequency band also prevents the binary exponential back-off from occurring which unnecessarily delays information exchanging. As a result, the AP 100 creating a CFP in the inactive frequency band suspends subscribers from transmitting inbound traffic, thus minimizing the number of subscribers dropping packets, or even, disassociating form the AP 100. If the subscribers are reliably signaled that a CFP is in progress, they will not transmit inbound unless polled by the AP 100. In this situation, the AP 100 will not poll and has no intention of polling these subscribers because the AP 100 is "off frequency".

The beacon interval should be picked to be sufficiently long (e.g., 50 ms) to make power savings a benefit since the subscriber must listen and interpret the beacon, and then enter a sleep mode until the next beacon. Transmitting two beacons, CF-END, and switching frequencies is an overhead of less than 2 ms that is less than 3% for 50 ms beacon intervals. Therefore there can still be a 95% energy savings in the subscriber.

Figure 2:
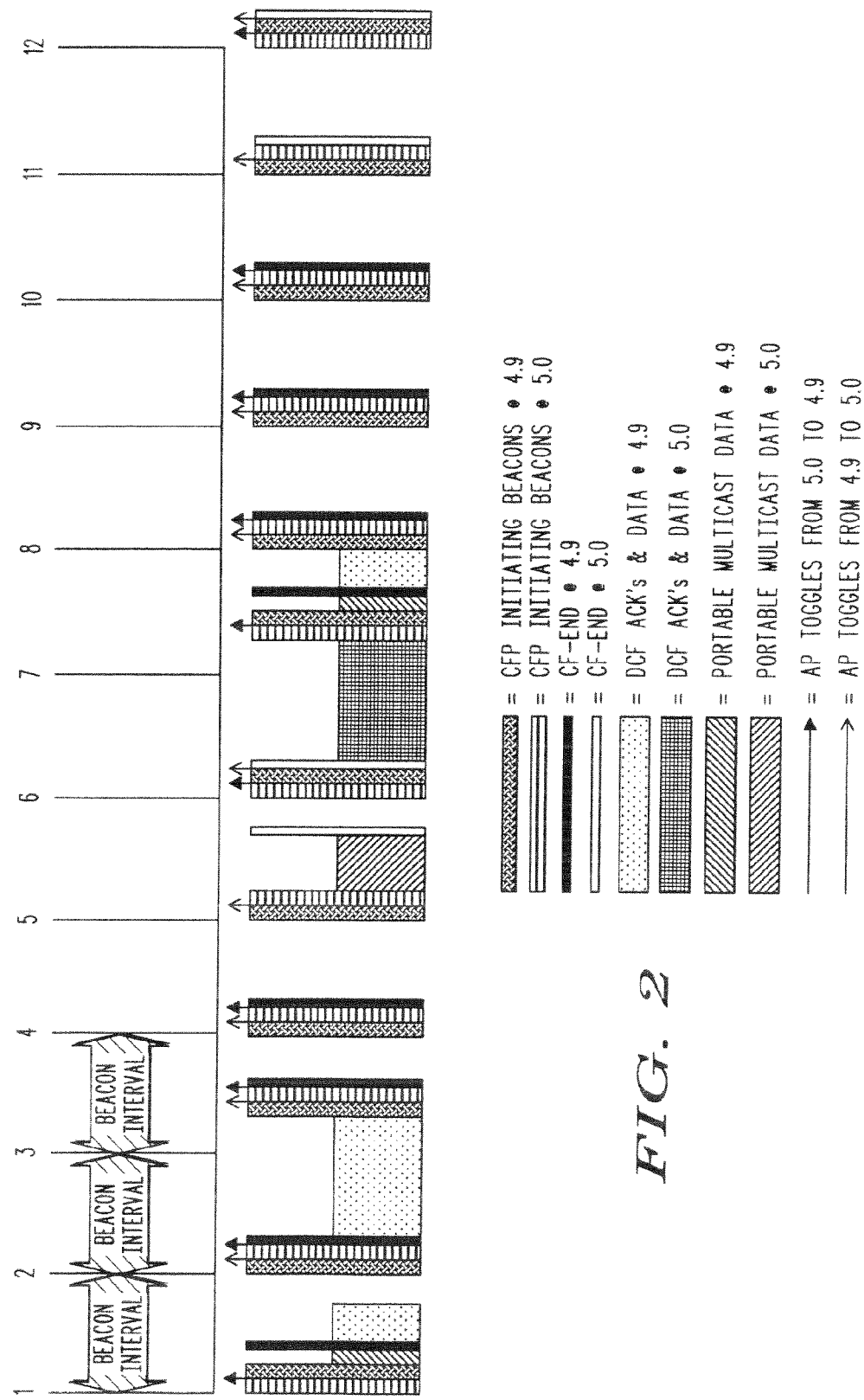
FIG. 2 illustrates an example of channel activity as seen by the access point during dual frequency band operation in accordance with the present invention.

Let us now refer to an example of the channel activity as seen by the AP 100 dual frequency band operation in accordance with the present invention as illustrated in FIG. 2. The AP 100 defines the timing for the entire basic service set by transmitting beacons according to a beacon interval attribute within the AP 100. If the medium is determined by the carrier-sense mechanism to be unavailable, the AP 100 delays the actual transmission of a beacon according to the basic medium access rules. It should be noted that though the transmission of a beacon might be delayed because of carrier sense multiple access deferrals, subsequent beacons should be scheduled at the nominal beacon interval. Assume for this example that a beacon interval is 50 TUs (i.e., 50 ms). Also assume that there is a 2:4 duty cycle between 5.0 GHz and 4.9 GHz, respectively.

In general, between target beacon intervals 1 through 5, and between 7.5 through 11, 4.9 GHz is the active frequency band and 5.0 GHz is the inactive frequency band; between target beacon intervals 5 through 7.5, and between 11 through 12, 5.0 GHz is the active frequency band and 4.9 GHz is the inactive frequency band. Let us now look at specific details of this example and how the AP 100 supports a plurality of frequency bands.

During target beacon interval 1, the AP 100 sends an announcement to the subscribers 102 operating at 5.0 GHz that the channel is going to a CFP. Upon hearing this announcement, all subscribers 102 operating at 5.0 GHz are waiting to be polled so they stay quite. In accordance with the present invention, the AP 100 never had the intention of polling the subscribers 102 operating at 5.0 GHz at this time, but rather sent the announcement in order to keep the subscribers 102 operating at 5.0 GHz quiet since the AP 100 will not be listening to the frequency. The AP 100 then toggles frequencies to 4.9 GHz, thus making the 4.9 GHz band the active frequency band.

Once operating on the 4.9 GHz band, the AP 100 sends a CFP message to the subscribers 104 operating at 4.9 GHz. Upon hearing this announcement, all subscribers 104 operating at 4.9 GHz also wait to be polled so they stay quite. The AP 100 then sends multicast traffic to the subscribers 104 operating at 4.9 GHz, if any. Once all the multicast traffic has been transmitted to the subscribers 104 operating at 4.9 GHz, the AP 100 sends a CF-End message to the subscribers 104 operating at 4.9 GHz, after which, the DCF mode begins (i.e., the air interface becomes contentious for the subscribers 104 operating at 4.9 GHz).

Because every beacon is a DTIM and the target beacon intervals have a fairly regular period regardless of when the frequency is active or inactive, subscribers in the active frequency band wake up for at least a portion of every target beacon interval. Therefore, the subscribers in the active frequency band are awake for the multicast traffic that has been buffered for them for several target beacon intervals. After delivering the multicast traffic to the subscribers in the active frequency band, the frequency band resumes to DCF mode by signaling the CF-end message.

During target beacon interval 2, the AP 100 signals a CFP at 4.9 GHz to keep subscribers 104 operating at 4.9 GHz from attempting to futilely transmit inbound. After signaling the CFP at 4.9 GHz, the AP 100 transitions to 5.0 GHz and transmits a beacon at 5.0 GHz to keep a fairly periodic train of beacons in the frequency band as well as redundantly signal the CFP at 5.0 GHz. The AP 100 transitions back to 4.9 GHz and signals a CF-End to resume DCF traffic at 4.9 GHz.

The DCF traffic that follows target beacon interval 2 delays the subsequent beacons scheduled for transmission during target beacon interval 3; the DCF data/ACK sequence had not yet completed before the third target beacon interval time is scheduled. The 802.11 standard allows for delays in beacon transmissions as long as the average rate approaches a beacon interval. Thus, upon completion of the DCF mode, the AP 100 repeats the signaling as it occurred in target beacon interval 2: the AP 100 signals a CFP at 4.9 GHz, transitions to 5.0 GHz and transmits a beacon at 5.0 GHz, and transitions back to 4.9 GHz and signals a CF-End. Even though there is no remaining DCF traffic from the subscribers 104 operating at 4.9 GHz during target beacon interval 3, the AP 100 remains in this mode until target beacon interval 5.

At target beacon interval 5, the AP 100 signals to the subscribers 104 operating at 4.9 GHz that a CFP is about to begin without the intention of ever polling. The AP 100 switches to 5.0 GHz, transmits another CFP, transmits multicast traffic to the subscribers 102 operating at 5.0 GHz and then transmits a CF-End. In target beacon interval 5, there is no DCF traffic from the subscribers 102 operating at 5.0 GHz, so the scheduled signaling for target beacon interval 6 starts on time.

During target beacon interval 6, the AP 100 signals a CFP at 5.0 GHz to keep subscribers 102 operating at 5.0 GHz from attempting to futilely transmit inbound. After signaling the CFP at 5.0 GHz, the AP 100 transitions to 4.9 GHz and transmits a beacon at 4.9 GHz to keep a fairly periodic train of beacons in the frequency band as well as redundantly signal the CFP at 4.9 GHz. The AP 100 transitions back to 5.0 GHz and signals a CF-End to enter a DCF mode at 5.0 GHz. The DCF traffic at 5.0 GHz, however, delays the scheduled signaling for target beacon interval 7. The signaling in the remaining target beacon intervals repeats for the next duty cycle.

Thus, in accordance with the present invention, a beacon preferably initiates each active frequency band, thus hastening the time it takes a subscriber to associate with an AP 100; polling is also possible because each beacon can signal a CFP. The AP 100 buffers multicast traffic for power-savings in the subscribers and delivers information per the 802.11 standard. There are multiple opportunities at signaling the CFP in the inactive frequency band increasing reliability. Multiple opportunities exist for DTIM/TIM functions to run per the standard.

Therefore, as described previously herein, the present invention provides a method for supporting a plurality of devices operating on different frequency bands during a first period of time at an access point: initiating a contention free period at a first frequency; switching from the first frequency to a second frequency; communicating with devices operating at the second frequency; and periodically during the first period of time, temporarily ceasing the step of communicating with devices operating at the second frequency to initiate a contention free period at the second frequency, switch from the second frequency to the first frequency, initiate another contention free period at the first frequency, and switch from the first frequency back to the second frequency.

The present invention further provides alternatively a method for supporting a plurality of devices operating on different frequency bands comprising at an access point: during a first period of time, initiating a contention free period at a first frequency; switching from the first frequency to a second frequency; and communicating with devices operating at the second frequency, and during a second period of time, initiating a contention free period at the second frequency; switching from the second frequency to the first frequency; and communicating with devices operating at the first frequency.

The present invention further provides alternatively a method for supporting a plurality of devices operating on different frequency bands comprising at an access point: during a first period of time, initiating a contention free period at a first frequency; switching from the first frequency to a second frequency; initiating a contention free period at the second frequency; transmitting multicast data to subscribers operating at the second frequency; ending the contention free period at the second frequency; and communicating with devices operating at the second frequency, during a second period of time, initiating a contention free period at the second frequency; switching from the second frequency to the first frequency; initiating a contention free period at the first frequency; transmitting multicast data to subscribers operating at the first frequency; ending the contention free period at the first frequency; and communicating with devices operating at the first frequency.

While the invention has been described in conjunction with specific embodiments thereof, additional advantages and modifications will readily occur to those skilled in the art. For example, it is possible to design the system in accordance with the present invention with a very rigid switch with little allowance for variability in the switching period. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

We claim:

1. A method of operation of an access point for supporting a first plurality of devices operating on a first frequency band and second plurality of devices operating on a second frequency band, the method comprising:
providing communication in a first transition beacon interval at the second frequency band by:
initiating a first contention free period at the first frequency, wherein the first plurality of devices remain associated with the access point during the first contention free period,
switching from the first frequency to the second frequency,
communicating with devices operating at the second frequency including transmitting multicast data and receiving and transmitting distributed coordinated function data and acknowledgements; and
providing communication in each of a first plurality of beacon intervals following the first transition beacon interval at the second frequency band, wherein each of the first plurality of beacon intervals is characterized by a beacon interval time, by:

temporarily ceasing the step of communicating with devices operating at the second frequency to initiate a second contention free period at the second frequency by signaling a contention free period beacon at the second frequency, wherein the second plurality of devices remain associated with the access point during the second contention free period, switching from the second frequency to the first frequency, initiating another contention free period at the first frequency, switching from the first frequency back to the second frequency, communicating with devices operating at the second frequency including receiving and transmitting distributed coordinated function data and acknowledgements, delaying the signaling of at least one of the contention free period beacons of one or more of the first plurality of beacon intervals based on a completion delay of a distributed coordinated function mode, and reducing a beacon interval time of the one or more of the first plurality of beacon intervals following a delayed beacon interval so that an average rate of the reduced beacon interval time and the delayed beacon interval time approaches the beacon interval time.

2. The method of claim 1 wherein initiating a first contention free period and initiating a second contention free period each comprise transmitting a beacon message.

3. The method of claim 1, further comprising, within the first transition beacon interval, initiating a distributed coordinated function mode prior to communicating with devices operating at the second frequency by the access point.

4. The method of claim 3, wherein initiating the distributed coordinated function mode allows devices operating at the second frequency to transmit inbound to the access point without having to be polled by the access point.

5. The method of claim 1, wherein the initiating of the contention free period within the first transition beacon interval comprises signaling a contention free period beacon at the second frequency, the method further comprising:

delaying the signaling of the contention free period beacon based on a completion delay of a distributed coordinated function mode.

6. The method of claim 2, further comprising:

receiving a contention free period beacon message by a communication device on the first frequency, wherein the communication device remains associated to the access point and does not initiate a distributed coordinated function mode in response to receiving the contention free period beacon message.

* * * * *